(12) United States Patent
Nakamura

(10) Patent No.: US 10,096,241 B2
(45) Date of Patent: Oct. 9, 2018

(54) PROBE DATA COLLECTION METHOD AND PROBE DATA COLLECTION DEVICE

(71) Applicant: Nissan Motor Co., Ltd., Yokohama-shi, Kanagawa (JP)

(72) Inventor: Masahide Nakamura, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 15/748,664

(22) PCT Filed: Aug. 28, 2015

(86) PCT No.: PCT/JP2015/074453
§ 371 (c)(1),
(2) Date: Jan. 30, 2018

(87) PCT Pub. No.: WO2017/037784
PCT Pub. Date: Mar. 9, 2017

(65) Prior Publication Data
US 2018/0225962 A1 Aug. 9, 2018

(51) Int. Cl.
*G08G 1/00* (2006.01)
*G08G 1/065* (2006.01)
*G08G 1/01* (2006.01)
*H04W 72/12* (2009.01)
*H04W 4/44* (2018.01)
*G08G 1/127* (2006.01)
(Continued)

(52) U.S. Cl.
CPC ........... *G08G 1/065* (2013.01); *G08G 1/0112* (2013.01); *G08G 1/0125* (2013.01); *G08G 1/127* (2013.01); *H04W 4/44* (2018.02); *H04W 72/121* (2013.01); *G08G 1/096716* (2013.01); *G08G 1/164* (2013.01); *G08G 1/20* (2013.01); *H04J 3/1694* (2013.01); *H04W 52/343* (2013.01); *H04W 72/005* (2013.01)

(58) Field of Classification Search
CPC .......... G08G 1/164; G08G 1/065; G08G 1/20; G08G 1/01; G08G 1/0125; G08G 1/0112; G08G 1/0133; G08G 1/0104; G08G 1/096716; G08G 1/00; H04W 72/005; H04W 72/0446; H04W 74/0816; H04W 52/343; H04J 3/1694
See application file for complete search history.

(56) References Cited

U.S. PATENT DOCUMENTS

2005/0216147 A1 9/2005 Ferman
2010/0273491 A1 10/2010 Colonna et al.
2010/0312432 A1 12/2010 Hamada et al.

FOREIGN PATENT DOCUMENTS

CN 101882381 A 11/2010
DE 199 56 682 A1 6/2001
(Continued)

*Primary Examiner* — Benyam Haile
(74) *Attorney, Agent, or Firm* — Global IP Counselors, LLP

(57) ABSTRACT

A probe data collection method is provided to ensure real-time nature of collected probe data and to reduce a communication load of the server. Based on received probe data, a total number of vehicles that have transmitted probe data and upload times of the probe data for each vehicle are detected. Based on the detected upload times, correction values of the upload times are calculated for each of the vehicle according to the total number of the vehicles. Then, the calculated correction values are transmitted to the vehicles.

7 Claims, 11 Drawing Sheets

(51) Int. Cl.
*H04W 72/00* (2009.01)
*G08G 1/0967* (2006.01)
*H04J 3/16* (2006.01)
*H04W 52/34* (2009.01)
*G08G 1/16* (2006.01)

(56) References Cited

FOREIGN PATENT DOCUMENTS

| | | |
|---|---|---|
| EP | 0 715 285 A1 | 6/1996 |
| JP | 10-63997 A | 3/1998 |
| JP | 11-306490 A | 11/1999 |
| JP | 2002-74591 A | 3/2002 |
| JP | 2006-65391 A | 3/2006 |

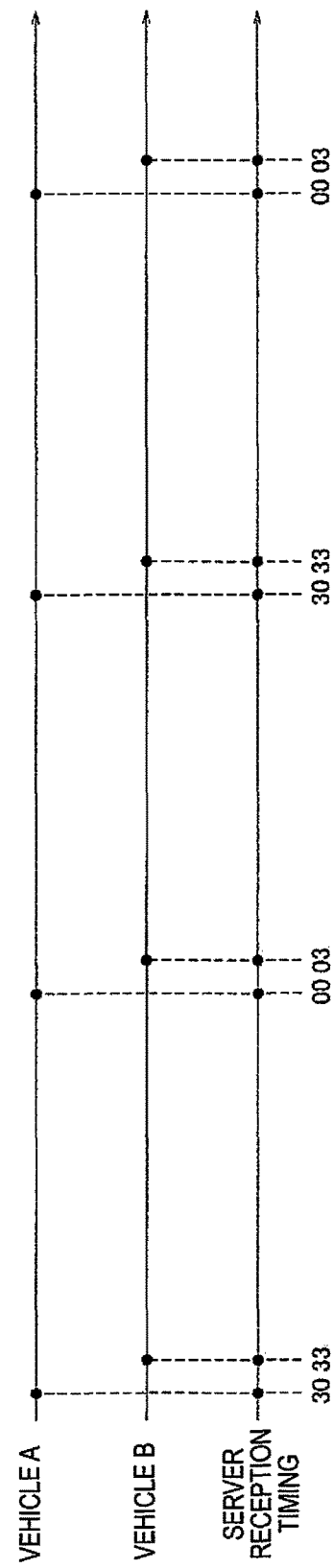

PROBE DATA COLLECTION METHOD AND PROBE DATA COLLECTION DEVICE

CROSS-REFERENCE TO RELATED APPLICATIONS

This application is a U.S. National stage application of International Application No. PCT/JP2015/074453, filed Aug. 28, 2015.

BACKGROUND

Field of the Invention

The present invention relates to a probe data collection method and a probe data collection device in a probe data management system for the collection of probe data that are transmitted from a vehicle.

Background Information

Conventionally, a probe data collection method is known, in which it is determined whether probe data that are transmitted from a vehicle is real-time transmission data or non-real-time transmission data, and real-time transmission data are preferentially transmitted over non-real-time transmission data (for example, see Japanese Laid-Open Patent Application No. 2006-65391, which is herein referred to as Patent Document 1).

SUMMARY

However, in the conventional probe data collection method, the type of probe data is determined on the vehicle side that transmits the data, and the transmission method is varied according to the determination result. Consequently, the timing for receiving data (the timing at which the data are transmitted) cannot be controlled on the server (center) side that receives the probe data, causing problems such as not being able to sufficiently secure the real-time nature of the probe data, and the communication load of the server becoming excessive.

In view of the problems described above, an object of the present invention is to provide a probe data collection method and a probe data collection device that are capable of both ensuring the real-time nature of the collected probe data and reducing the communication load of the server.

In order to achieve the object above, the present invention provides a probe data collection method in a probe data management system comprising a server that receives probe data that are transmitted from vehicles, and a database that stores the probe data received by the server. Here, the server detects the total number of vehicles that transmitted data, and the upload times of the probe data for each vehicle, based on the received probe data. Then, correction values of the upload times corresponding to the total number of vehicles are calculated based on the upload times detected for each vehicle. Then, the calculated correction values are transmitted to the respective vehicles.

Therefore, in the present invention, the server calculates the correction values of the upload times of the probe data of the vehicles, in accordance with the total number of vehicles that transmitted probe data. Then, the correction values of the upload times are transmitted to the vehicles that transmitted the probe data. The upload timings of each vehicle can thereby be controlled by the server according to the vehicle density. As a result, the probe data reception timing of the server can be controlled, and it becomes possible to prevent both an occurrence of bias in the data reception intervals and the number of received pieces of data from becoming enormous. Then, it becomes possible to both ensure the real-time nature of the collected probe data and to reduce the communication load of the server.

BRIEF DESCRIPTION OF THE DRAWINGS

FIG. 7A is an explanatory view illustrating the transmission and reception timings of probe data before carrying out an equalization correction.

DETAILED DESCRIPTION OF THE EMBODIMENTS

Figure 1:
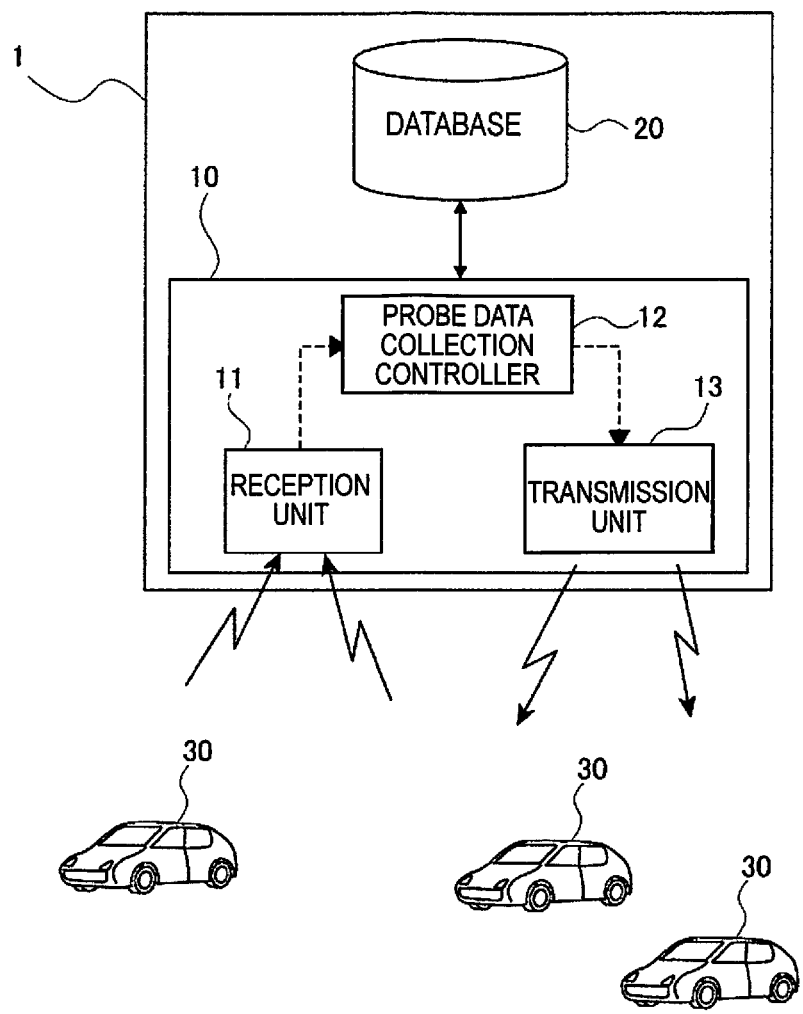
FIG. 1 is an overall system view illustrating a probe data management system having a probe data collection device according to the first embodiment.
Figure 1:
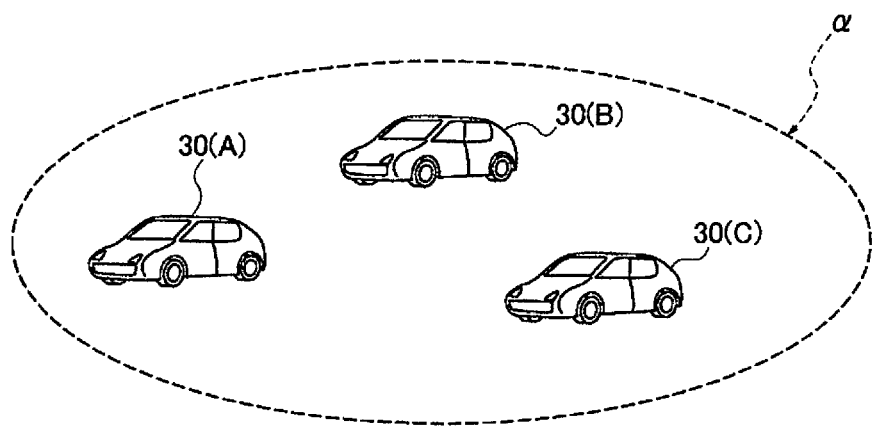

An embodiment for implementing the probe data collection method and the probe data collection device of the present invention is described below based on the first embodiment illustrated in the drawings.

First Embodiment

First, the "overall system configuration" and the "configuration of the data collection control process" will be separately described regarding the configuration of the probe data collection device of the first embodiment.

Overall System Configuration

FIG. 1 is an overall system view illustrating a probe data management system provided with the probe data collection device according to the first embodiment. The overall system configuration of the embodiment will be described below based on FIG. 1.

The probe data management system 1 according to the first embodiment comprises a server 10 and a database 20, as illustrated in FIG. 1.

The server 10 is a computer that collects probe data from a large number of vehicles, and stores the collected probe data in a database in association with vehicle IDs. This server 10 comprises a reception unit 11, a probe data collection controller 12, and a transmission unit 13, as illustrated in FIG. 1.

The reception unit 11 receives probe data and ignition signals (including start switch signals) that are transmitted from the large number of vehicles 30, and stores the received probe data in the database 20. Vehicles 30 include, in addition to engine-equipped vehicles having only an engine as a traveling drive source and electrically driven vehicles (hybrid vehicles and electric vehicles) having a motor as a traveling drive source, trucks, buses, and motorcycles.

On the other hand, probe data include an identification number (vehicle ID) attached to each vehicle 30 and position information obtained from a GPS (Global Positioning System) mounted in each vehicle 30, and here, comprise at least point sequence data and trip data. The point sequence data and the trip data are stored in the database 20 respectively associated with a vehicle ID.

Figure 2:
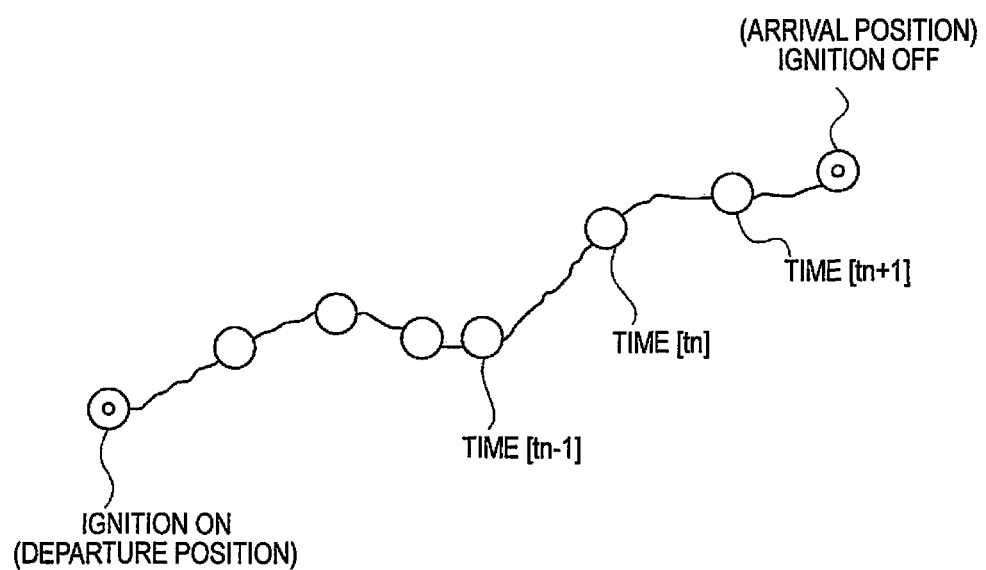
FIG. 2 is a conceptual viewpoint of sequence data indicated based on probe data.

The point sequence data are data transmitted from each vehicle 30 at set intervals (for example, 30 seconds) from ignition ON to ignition OFF, comprising the data transmission time, the data transmission position, and the travel distance. Here, the "data transmission position" is information indicating the position of the vehicle 30 (position information) when transmitting the data, and is indicated by latitude and longitude. The "travel distance" is information indicating the distance from the position where the previous data were transmitted to the position where the current data were transmitted. Connecting the "data transmission positions" shown on the map in chronological order based on these point sequence data results in movement trajectory information as illustrated in FIG. 2.

The trip data are data that are transmitted from each vehicle 30 only once between ignition ON and ignition OFF, and comprise the departure time, the arrival time, the departure position, the arrival position, and the total travel distance. Here, the "departure time" is information indicating the time at which ignition ON was carried out. The "arrival time" is information indicating the time at which ignition OFF was carried out. The "departure position" is information indicating the vehicle position when ignition ON was carried out. The "arrival position" is information indicating the vehicle position when ignition OFF was carried out. The "departure position" and the "arrival position" are indicated by latitude and longitude. The "total travel distance" is information indicating the distance from the position where ignition ON was carried out to the position where ignition OFF was carried out, and is the sum of the "travel distance" in the point sequence data.

The probe data collection controller 12 grasps the reception timing of the probe data in the reception unit 11. Then, in order to control this reception timing, a probe data collection control process, described later, is executed, to calculate correction values of the upload times of the probe data in vehicles 30 (A, B, C in FIG. 1) that are present in a predetermined traveling area α (area surrounded by the broken line in FIG. 1). The calculated correction values of the upload times of the probe data are output from the probe data collection controller 12 to the transmission unit 13.

The transmission unit 13 is an external communication mechanism that communicates with the vehicles 30 (A, B, C in FIG. 1) that are present in the predetermined traveling area α specified by the probe data collection controller 12. The correction values of the upload times output from the probe data collection controller 12 are transmitted to the vehicles 30 (A, B, C) within the predetermined traveling area α. Each vehicle 30 comprises a data transmission unit that transmits probe data to the reception unit 11 of the server 10, and a data reception unit that receives the correction values of the upload times from the transmission unit 13. When receiving the correction values of the upload times from the transmission unit 13, the vehicles 30 (A, B, C) within the predetermined traveling area α change the timings (upload times) for transmitting the probe data according to the correction values.

The database 20 is a memory capable of sending and receiving data to and from the server 10. In addition to the probe data obtained from a plurality of vehicles 30, map data, user information including vehicle ID and User ID, and the like, are stored in this database 20.

Configuration of the Data Collection Control Process

Figure 3:
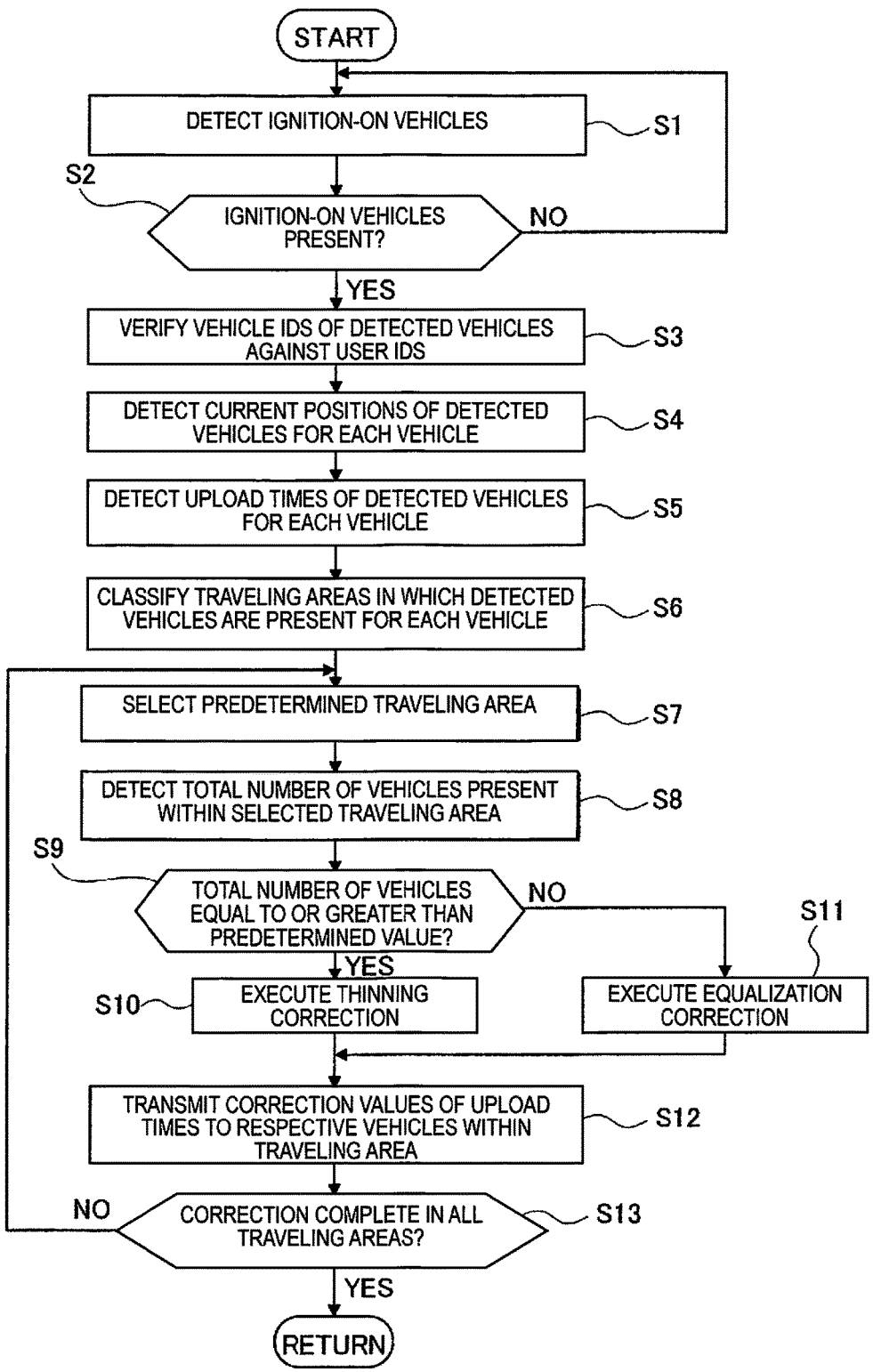
FIG. 3 is a flowchart illustrating the flow of the data collection control process that is executed in the first embodiment.

FIG. 3 is a flowchart illustrating the flow of a data collection control process that is executed in the first embodiment. The configuration of the data collection control process according to the first embodiment will be described below based on FIG. 3.

In Step S1, vehicles that are in an ignition ON state are detected, and the process proceeds to Step S2. Here, an ignition ON state is determined when there is an input of an ignition signal from a vehicle 30 to the reception unit 11.

In Step S2, following the detection of ignition ON vehicles in Step S1, it is determined whether or not there is a vehicle in the ignition ON state. In the case of YES (ignition ON vehicles present), the process proceeds to Step S3, and if NO (ignition ON vehicles absent), the process returns to Step S1.

In Step S3, following the determination that ignition ON vehicles are present in Step S2, the vehicle IDs of the vehicles (ignition ON vehicles) detected in Step S2 are verified against User IDs that are stored in the database 20 in advance, and the process proceeds to Step S4.

In Step S4, following the verification of the vehicle IDs in Step S3, the current positions of the vehicles detected in Step S2 (ignition ON vehicles) are detected for each vehicle, and the process proceeds to Step S5. Here, the current position information is detected based on the data transmission position information included in the point sequence data of the probe data. In addition, this detection of the current position is executed for all vehicles detected in Step S2. In addition to the latitude and longitude that indicate the vehicle position, this current position information may include the traveling direction of the vehicles that are traveling.

In Step S5, following the detection of the current positions of the vehicles in Step S4, the upload times of the vehicles detected in Step S2 (ignition ON vehicles) are detected for each vehicle, and the process proceeds to Step S6. Here, upload times are times indicating the timings at which probe data are transmitted from the vehicles 30, and are, for example, information such as "00 seconds and 30 seconds every minute" or "00 seconds→35 seconds→10 seconds→45 seconds→20 seconds→55 seconds→30 seconds . . . " This upload time information is detected based on the data transmission time information included in the point sequence data of the probe data. In addition, this detection of the upload times is executed for all vehicles detected in Step S2.

In Step S6, following the detection of the upload times in Step S5, the traveling areas in which the vehicles detected in Step S2 (ignition ON vehicles) are present are classified for each vehicle based on the current position of each vehicle detected in Step S4, and the process proceeds to Step S7. Here, "traveling areas" are individual areas obtained by partitioning an area from which the server 10 can receive probe data into a plurality of areas, and are arbitrarily set in advance. These traveling areas are, for example, areas along a specific lane, areas along the up lane of a specific lane, or the like. In addition, traveling areas may be partitioned based on links, intersections, etc., that are set on a lane. Then, the classification of these traveling areas is carried out based on the current position information detected in Step S4 and the traveling area sections that are set in advance. In addition, this classification of the traveling areas is executed for all vehicles detected in Step S2.

In Step S7, following the classification of the traveling areas in Step S6, a predetermined area is arbitrarily selected from the plurality of traveling areas that are set in advance, and the process proceeds to Step S8. Here, the selection of the traveling area may be carried out according to an order that is set in advance, or may be carried out based on a condition that is arbitrarily set.

In Step S8, following the selection of the traveling area in Step S7, the total number of vehicles 30 that are present within the selected traveling area is detected, and the process proceeds to Step S9. Here, the detection of the total number of vehicles within the traveling area is carried out based on the current position information detected in Step S4 and the information on the traveling areas in which the vehicles are present classified in Step S6.

In Step S9, following the detection of the total number of vehicles in Step S8, it is determined whether or not the total number of vehicles within the predetermined traveling area detected in Step S8 is equal to or greater than a predetermined value Th, which is set in advance. In the case of YES (equal to or greater than the predetermined value Th), the process proceeds to Step S10, and if NO (less than the predetermined value Th), the process proceeds to Step S11. Here, the "predetermined value Th" is the number of cars at which the communication load of the server 10 is thought to become excessive. The number of pieces of received probe data increases as the total number of vehicles within the traveling area increases, and the real-time nature of the probe data is improved. However, if the total number of vehicles becomes too large, the amount of data received by the server 10 becomes enormous, becoming an excessive communication load. The "predetermined value Th" described above is a value that is set based on the boundary between the securing of real-time nature and an excessive communication load.

In Step S10, following the determination that the total number of vehicles is equal to or greater than the predetermined value Th in Step S9, thinning correction is carried out with respect to the respective upload times of the vehicles 30 that are present within the selected traveling area, and the process proceeds to Step S12. Here, "thinning correction" means to calculate a correction value for reducing the number of probe data received by the reception unit 11 of the server 10 during a predetermined period, and, in this case, one of "transmission interval extension correction," "transmission data number reduction correction," and "data transmission vehicle reduction correction" is carried out in accordance with the total number of vehicles. The first threshold value Th1 and the second threshold value Th2, described later, are arbitrarily set. The "transmission interval extension correction" is to calculate a correction value to extend the upload interval of the probe data by each vehicle 30, and is carried out when the total number of vehicles within the predetermined traveling area is relatively small, even if equal to or greater than the predetermined value Th (when the total number of vehicles is less than a first threshold value Th1 (>Th)). That is, in this "transmission interval extension correction," in which probe data are being transmitted from each vehicle 30 at 30-second intervals, the upload interval is corrected to 40 seconds for a certain vehicle X, while the upload interval is corrected to 35 seconds for a different vehicle Y. In this "transmission interval extension correction," it is not necessary to extend the upload interval of all vehicles, and it is not necessary to carry out an extension of the upload interval depending on the vehicle. The "transmission data number reduction correction" is to calculate a correction value to reduce the number of uploads of the probe data within a predetermined time by each vehicle 30, and is carried out when the total number of vehicles within the predetermined traveling area is equal to or greater than the predetermined value Th but is relatively small (when the total number of vehicles is equal to or greater than the first threshold value Th1 and less than a second threshold value Th2 (>Th1)). That is, in this "transmission data number reduction correction," in which probe data are being transmitted from each vehicle 30 at 30-second intervals, a certain vehicle M is corrected to transmit at 60-second intervals (that is, the number of uploads is halved compared to before correction), and a different vehicle N is corrected to transmit at 90-second intervals (the number of uploads is set to ⅓ compared to before correction). In this "transmission data number reduction correction," it is not necessary to reduce the number of uploads of all vehicles, and it is not necessary to carry out a reduction in the number of uploads depending on the vehicle. Furthermore, the "data transmission vehicle reduction correction" is to calculate a correction value to reduce the number of vehicles that transmit probe data, and is carried out when the total number of vehicles within the predetermined traveling area is equal to or greater than the predetermined value Th, and is relatively large (when the total number of vehicles is equal to or greater than the second threshold value Th2). That is, in this "data transmission vehicle reduction correction," in which all vehicles 30 within the predetermined traveling area α are transmitting probe data, a correction is made such that only half of the vehicles 30 present within the traveling area α transmit probe data. In this "data transmission vehicle reduction correction," the number of vehicles for stopping data transmission is arbitrarily set.

In Step S11, following the determination that the total number of vehicles is less than the predetermined value Th in Step S9, an equalization correction is carried out with respect to the respective upload times of the vehicles 30 that are present within the selected traveling area, and the process proceeds to Step S12. Here, "equalization correction" is a correction to calculate correction values for offsetting the upload times without changing the upload intervals of the probe data and dispersing the reception intervals of the probe data by the server 10, and is specifically carried out by calculating correction values of upload times that make the reception intervals of the probe data by the server 10 constant. That is, it is assumed that the upload times of a certain vehicle P are "20 seconds and 50 seconds every minute" and the upload times of a different vehicle Q are "25 seconds and 55 seconds every minute." In this case, probe data are transmitted from the vehicle P at 20 seconds every minute and at 50 seconds every minute, and probe data are transmitted from vehicle Q at 25 seconds every minute and at 55 seconds every minute. In contrast, the upload times of vehicle P are not corrected (correction value=0), and a correction value to be added to the upload times is calculated for vehicle Q such that the upload times become "05 seconds and 35 seconds every minute" (correction value=10 seconds).

In Step S12, after calculating correction values of the upload times in Step S10 or Step S11, the correction values of the upload times for each vehicle 30 are respectively transmitted to the vehicles 30 that are present within the selected traveling area, and the process proceeds to Step S13.

In Step S13, following the transmission of the correction values of the upload times in Step S12, it is determined whether or not the correction of the upload times of the vehicles 30 that are present in each traveling area has been completed for all traveling areas that are set in advance. In the case of YES (correction complete), the process proceeds to RETURN, and if NO (correction incomplete), the process returns to Step S7.

Next, the actions are described. The "upload time correction action," the "transmission interval extension correction action," the "transmission data number reduction correction action," the "data transmission vehicle reduction correction action," and the "equalization correction action" will be separately described regarding the actions of the probe data collection device according to the first embodiment.

Upload Time Correction Action

In the probe data management system 1 according to the first embodiment, probe data are collected by receiving probe data transmitted from vehicles 30 that are present around the server 10 of the probe data management system 1 and storing the probe data in a database 20. Here, when entering an ignition ON state, each vehicle 30 continues to transmit probe data to the server 10 at a preset timing (for example, at 30-second intervals) until an ignition OFF state is reached. That is, in each vehicle 30, the upload times are set based on the time at which the host vehicle reaches the ignition ON state, and probe data are transmitted when it becomes the set upload time.

Accordingly, the server 10, which receives the probe data, receives the probe data when the vehicles 30 transmit the probe data; therefore, the reception timing of probe data by the server 10 is dependent on the ignition ON time of each vehicle 30 and the total number of vehicles 30 that transmit probe data. That is, if a plurality of vehicles 30 reaches the ignition ON state in succession, the server 10 would receive the probe data continuously over a short period of time, then after a certain period of waiting time, the server would continuously receive probe data again, creating a bias in the reception timings of the probe data. In addition, if the total number of vehicles 30 that transmit probe data is small, or the data transmission frequency in each vehicle 30 is low, the amount of probe data that can be collected in the server 10 becomes small. In these cases, probe data cannot be appropriately collected in chronological order, and there arises a problem in that the real-time nature of the data cannot be ensured.

On the other hand, when vehicles 30 are concentrated in a certain traveling area, such as when a traffic jam occurs, the amount of probe data that are transmitted from said traveling area becomes enormous. Consequently, the communication load of the server 10 becomes excessive, and the information processing load in the server 10 becomes excessive, causing problems such as appropriate information processing becoming difficult to carry out.

In contrast, in the probe data collection device according to the first embodiment, the server 10 calculates the correction values of the upload times of the probe data of the vehicles 30, and the timings at which the server 10 receives the probe data are controlled. An increase in the number of pieces of data and bias in the reception timings of the probe data are thereby suppressed, to both ensure the real-time nature and reduce the communication load.

That is, in the first embodiment, in order to control the timings for receiving the probe data that are transmitted from the vehicles 30 by the reception unit 11 of the server 10, first, in the flowchart illustrated in FIG. 3, the process proceeds from Step S1→Step S2→Step S3, such that vehicles in the ignition ON state are detected, and the vehicle IDs of the detected ignition ON vehicles are verified against User IDs. Then, when the verification of the vehicle IDs and the User IDs is completed, the process proceeds from Step S4→Step S5→Step S6, such that the current position and the upload time is detected for each vehicle 30, and the traveling areas in which the vehicles 30 are present are classified for each vehicle 30.

Then, when the classification of the traveling areas is completed for all vehicles 30 that are in the ignition ON state, the process proceeds to Step S7, and a predetermined traveling area is arbitrarily selected. When a traveling area is selected, the process proceeds to Step S8, the total number of vehicles 30 that are present within the traveling area is detected, and the correction values of the upload times are calculated according to the total number of vehicles within the traveling area. That is, if the total number of vehicles within the traveling area is equal to or greater than the predetermined value Th, the process proceeds from Step S9→Step S10, and a "thinning correction" for reducing the number of pieces of probe data received by the reception unit 11 of the server 10 during a predetermined period is executed. In addition, if the total number of vehicles within the traveling area is less than the predetermined value Th, the process proceeds from Step S9→Step S11, and an "equalization correction" is executed whereby the upload times are offset without changing the upload intervals of the probe data, and the reception intervals of the probe data by the server 10 is dispersed. Then, when the correction values of the upload times for each vehicle 30 are calculated, these correction values of the upload times are transmitted to each of the vehicles 30 that are present within the selected traveling area.

As a result, the upload times of the vehicles 30 will be controlled by the server 10, and biases in the reception timings of the probe data and increases in the number of receptions of the probe data in the server 10 will be eliminated. It thereby becomes possible to both ensure the real-time nature of the probe data and reduce the communication load of the server 10.

In addition, in this first embodiment, an area from which the server 10 can receive probe data is partitioned into a plurality of traveling areas, and correction values corresponding to the total number of vehicles that are present within the traveling areas are calculated for each of the traveling areas. Accordingly, the reception timings of probe data are controlled for each of the limited partitions, and it becomes possible to facilitate the calculation of the correction values of the upload times. It is thereby possible to promptly correct the upload times with respect to changes in the total number of vehicles, and to appropriately control the reception timings of the probe data.

In addition, in this first embodiment, the method of correcting the upload times is changed according to the total number of vehicles that are present within the selected traveling area. That is, if the total number of vehicles within the traveling area is equal to or greater than the predetermined value Th, a "thinning correction" for reducing the number of pieces of probe data received by the server during a predetermined period is executed. In addition, if the total number of vehicles within the traveling area is less than the predetermined value Th, an "equalization correction" is executed whereby the upload times are offset without changing the upload intervals of the probe data, and the reception intervals of the probe data by the server 10 are dispersed.

It is thereby possible to dynamically change the reception frequency of the probe data by the server 10 in accordance with the vehicle density for each traveling area, and to appropriately prevent an excessive communication load on the server 10 and secure the real-time nature of the probe data.

Transmission Interval Extension Correction Action

Figure 4A:
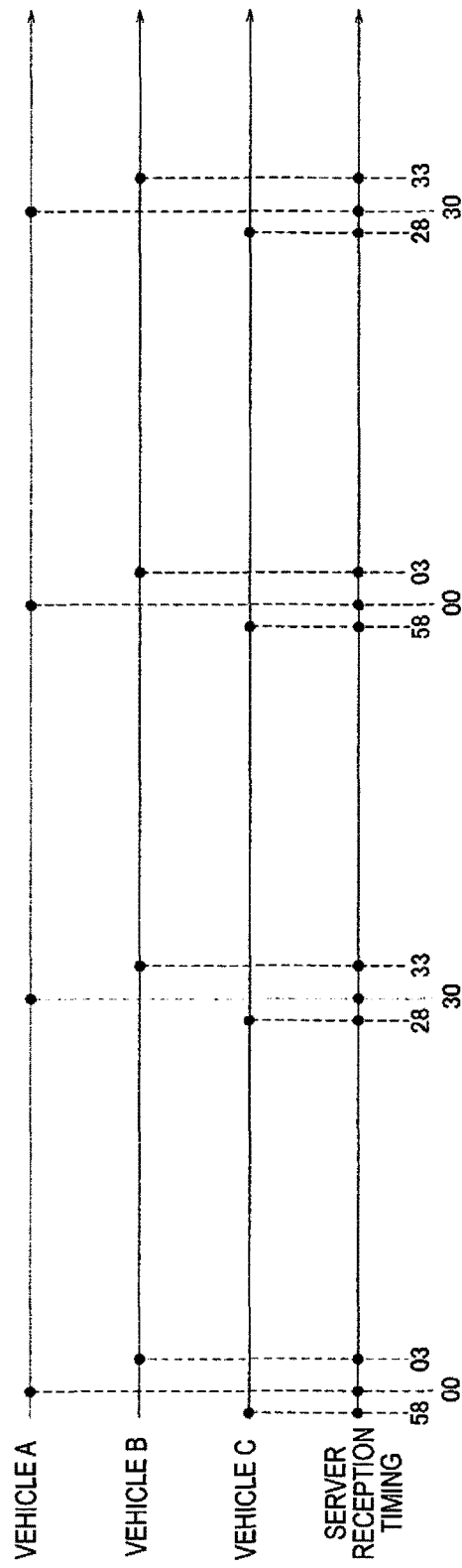
FIG. 4A is an explanatory view illustrating the transmission and reception timings of probe data before carrying out a transmission interval extension correction.
Figure 4B:
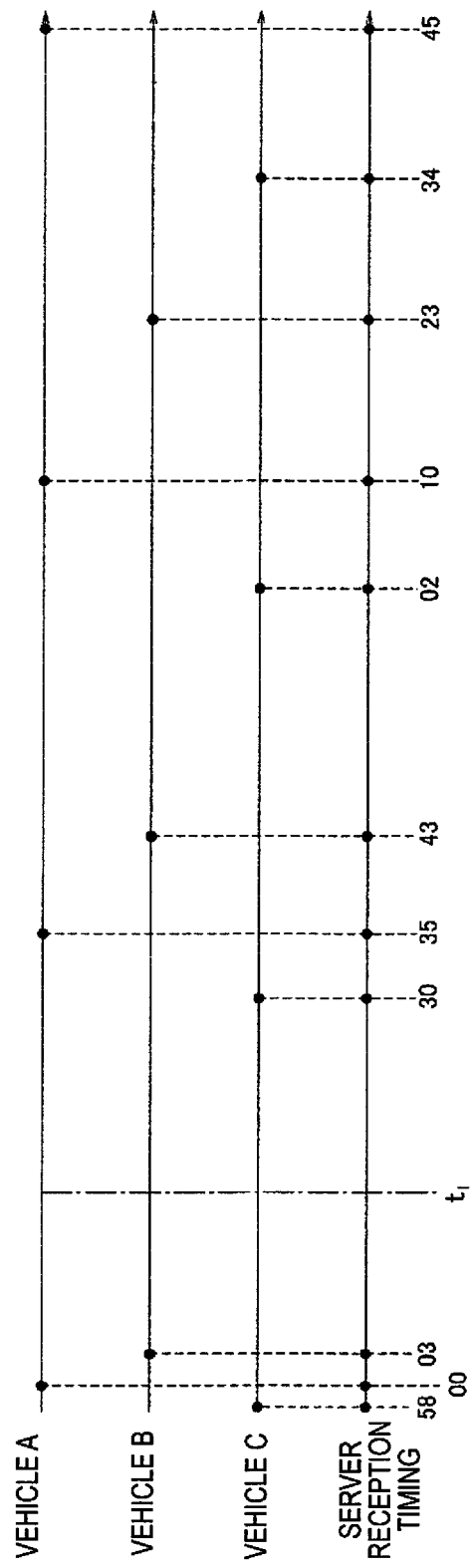
FIG. 4B is an explanatory view illustrating the transmission and reception timings of probe data when executing the transmission interval extension correction with respect to the transmission and reception timings shown in FIG. 4A.

FIG. 4A is an explanatory view illustrating the transmission and reception timings of probe data before carrying out a transmission interval extension correction, and FIG. 4B is an explanatory view illustrating the transmission and reception timings of probe data when executing the transmission interval extension correction with respect to the transmission and reception timings shown in FIG. 4A. The transmission interval extension correction action of the first embodiment will be described below, based on FIG. 4A and FIG. 4B.

In the data collection control process according to the first embodiment, when the total number of vehicles that are present within a predetermined traveling area is equal to or greater than a predetermined value Th but is relatively small, that is, when less than a first threshold value Th1, as part of the "thinning correction," a "transmission interval extension correction" is carried out whereby the upload intervals of each vehicle 30 are increased.

A specific description is as follows. It is assumed that three vehicles 30, vehicle A, vehicle B, and vehicle C, are present within a predetermined traveling area. At this time, before correction, the vehicles A, B, C are respectively transmitting probe data every 30 seconds, based on the time at which the respective host vehicle reached an ignition ON state; for example, it is assumed that the upload times of vehicle A are "00 seconds and 30 seconds every minute," the upload times of vehicle B are "03 seconds and 33 seconds every minute," and the upload times of vehicle C are "28 seconds and 58 seconds every minute." In this case, reception of probe data is repeated in the server 10 at timings of 58 seconds (vehicle C)→00 seconds (vehicle A)→03 seconds (vehicle B)→(25-second gap)→28 seconds (vehicle C)→30 seconds (vehicle A)→33 seconds (vehicle B)→(25-second gap)→58 seconds (vehicle C)→00 seconds (vehicle A) . . . every minute, as illustrated in FIG. 4A. Consequently, a bias occurs in the reception timings in the server 10 wherein probe data are continuously received from three vehicles A, B, C, then there is a gap of a set time; therefore, it becomes impossible to grasp the traveling situation during which probe data cannot be received, and it becomes impossible to secure the real-time nature of the data.

With respect to the above, a "transmission interval extension correction" is executed to calculate correction values such that the upload interval of vehicle A is set to 35 seconds, the upload interval of vehicle B is set to 40 seconds, and the upload interval of vehicle C is set to 32 seconds. The upload times of vehicle A are thereby corrected to "35 seconds→10 seconds→45 seconds→20 seconds . . . " In addition, the upload times of vehicle B are corrected to "43 seconds→23 seconds→03 seconds . . . " Furthermore, the upload times of vehicle C are corrected to "30 seconds→02 seconds→34 seconds→06 seconds . . . ."

Accordingly, when the correction values of the upload times are transmitted to the vehicles A, B, C at time $t_1$, the timings at which the probe data are transmitted from the vehicles A, B, C will be changed, as illustrated in FIG. 4B. As a result, the server 10 receives probe data at 30 seconds (vehicle C)→35 seconds (vehicle A)→43 seconds (vehicle B)→02 seconds (vehicle C)→10 seconds (vehicle A)→23 seconds (vehicle B)→34 seconds (vehicle C)→45 seconds (vehicle A) . . . .

In this manner, in contrast to the server 10 having received probe data at biased timings, it becomes possible to differ the reception timings of the probe data by the server 10. Then, biased idle times are less likely to occur at the time of receiving probe data, and it becomes possible to ensure the real-time nature of the probe data.

Transmission Data Number Reduction Correction Action

Figure 5A:
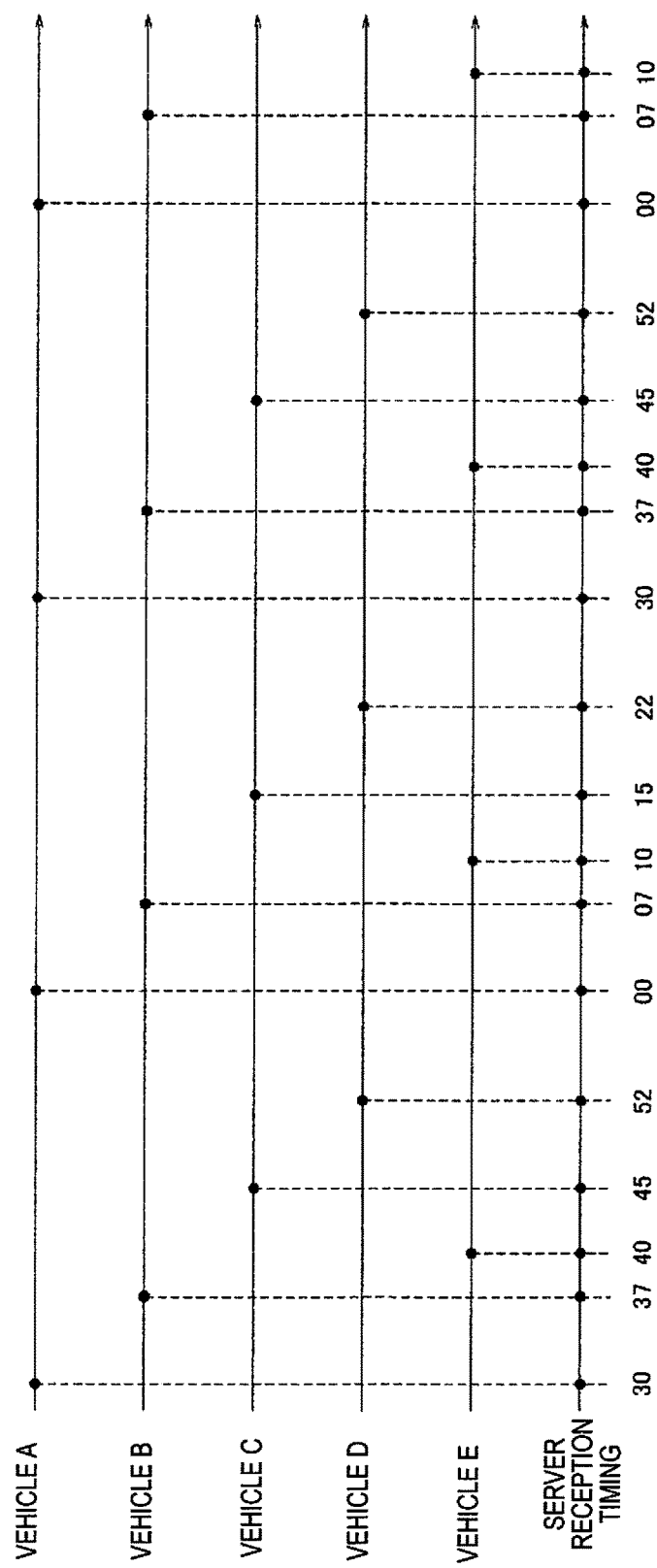
FIG. 5A is an explanatory view illustrating the transmission and reception timings of probe data before carrying out a transmission data number reduction correction.
Figure 5B:
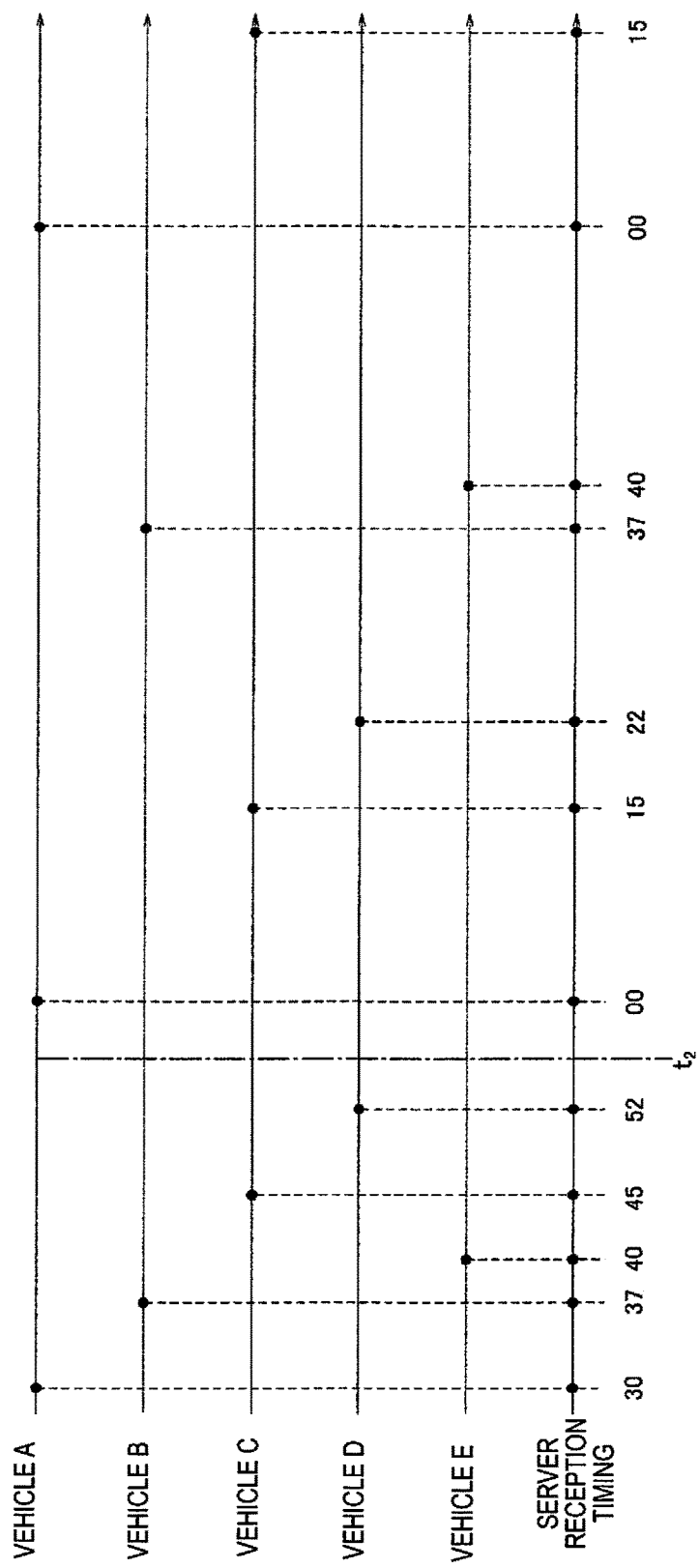
FIG. 5B is an explanatory view illustrating the transmission and reception timings of probe data when executing the transmission data number reduction correction with respect to the transmission and reception timings shown in FIG. 5A.

FIG. 5A is an explanatory view illustrating the transmission and reception timings of probe data before carrying out a transmission data number reduction correction, and FIG. 5B is an explanatory view illustrating the transmission and reception timings of probe data when executing the transmission data number reduction correction with respect to the transmission and reception timings shown in FIG. 5A. The transmission data number reduction correction action of the first embodiment will be described below, based on FIG. 5A and FIG. 5B.

In the data collection control process according to the first embodiment, when the total number of vehicles that are present within a predetermined traveling area is equal to or greater than a predetermined value Th but is small, that is, when equal to or greater than the first threshold value Th1 and less than a second threshold value Th2, as part of the "thinning correction," a "transmission data number reduction correction" is carried out whereby the number of uploads by each vehicle 30 within a predetermined time is reduced.

A specific description is as follows. It is assumed that five vehicles 30, vehicle A, vehicle B, vehicle C, vehicle D, and vehicle E, are present within a predetermined traveling area. At this time, before correction, the vehicles A, B, C, D, E are respectively transmitting probe data every 30 seconds, based on the time at which the respective host vehicle reached an ignition ON state; for example, it is assumed that the upload times of vehicle A are "00 seconds and 30 seconds every minute," the upload times of vehicle B are "07 seconds and 37 seconds every minute," the upload times of vehicle C are "15 seconds and 45 seconds every minute," the upload times of vehicle D are "22 seconds and 52 seconds every minute," and the upload times of vehicle E are "10 seconds and 40 seconds every minute." In this case, reception of probe data is repeated in the server 10 at timings of 30 seconds (vehicle A)→37 seconds (vehicle B)→40 seconds (vehicle E)→45 seconds (vehicle C)→52 seconds (vehicle D)→00 seconds (vehicle A)→07 seconds (vehicle B)→10 seconds (vehicle E)→15 seconds (vehicle C)→22 seconds (vehicle D)→30 seconds (vehicle A) . . . every minute, as illustrated in FIG. 4A. Consequently, the amount of probe data received by the server 10 becomes large, the communication load of the server 10 becomes excessive, and it becomes difficult to carry out appropriate information processing.

With respect to the above, a "transmission data number reduction correction" is executed to set the number of times of transmission of probe data to be carried out in one minute by each of the vehicles A, B, C, D, E to one. That is, a correction value is calculated to set the upload interval of each of the vehicles A, B, C, D, E to 60 seconds. As a result, the upload time of vehicle A is corrected to "00 seconds every minute," the upload time of vehicle B is corrected to "37 seconds every minute," the upload time of vehicle C is corrected to "15 seconds every minute," the upload time of vehicle D is corrected to "22 seconds every minute," and the upload time of vehicle E is corrected to "40 seconds every minute."

Accordingly, when the correction values of the upload times are transmitted to the vehicles A, B, C, D, E at time $t_2$, the timings at which the probe data are transmitted from the vehicles A, B, C, D, E will be changed, as illustrated in FIG. 5B. As a result, the server 10 receives probe data at 00 seconds (vehicle A)→15 seconds (vehicle C)→22 seconds (vehicle D)→37 seconds (vehicle B)→40 seconds (vehicle E)→00 seconds (vehicle A) . . . every minute.

In this manner, even if the total number of vehicles 30 that are present within the traveling area is large, and the amount of probe data that are transmitted to the server 10 is large, by executing the "transmission data number reduction correction," it is possible to easily reduce the number of receptions of probe data in the server 10. Then, it is possible to reduce the communication load of the server 10 by appropriately spacing the intervals of the data reception timings.

Data Transmission Vehicle Reduction Correction Action

Figure 6A:
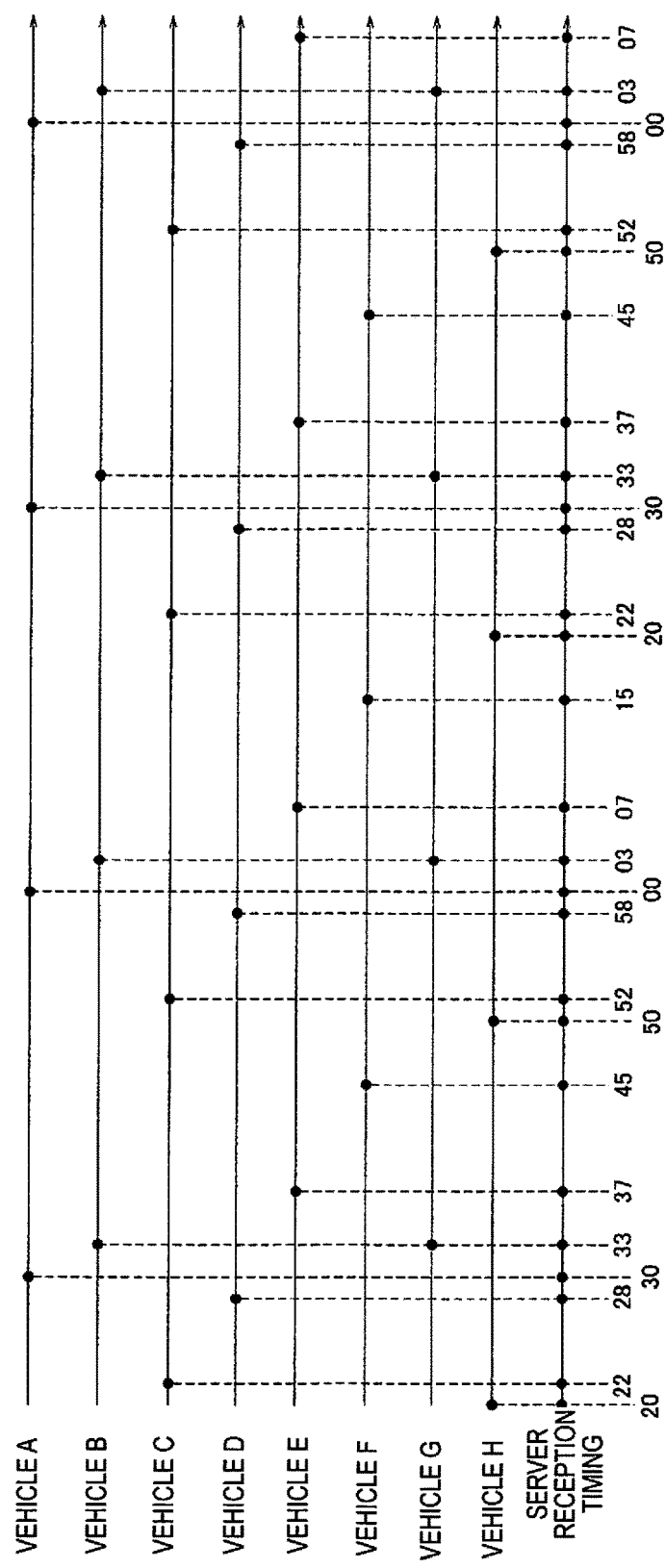
FIG. 6A is an explanatory view illustrating the transmission and reception timings of probe data before carrying out a data transmission vehicle reduction correction.
Figure 6B:
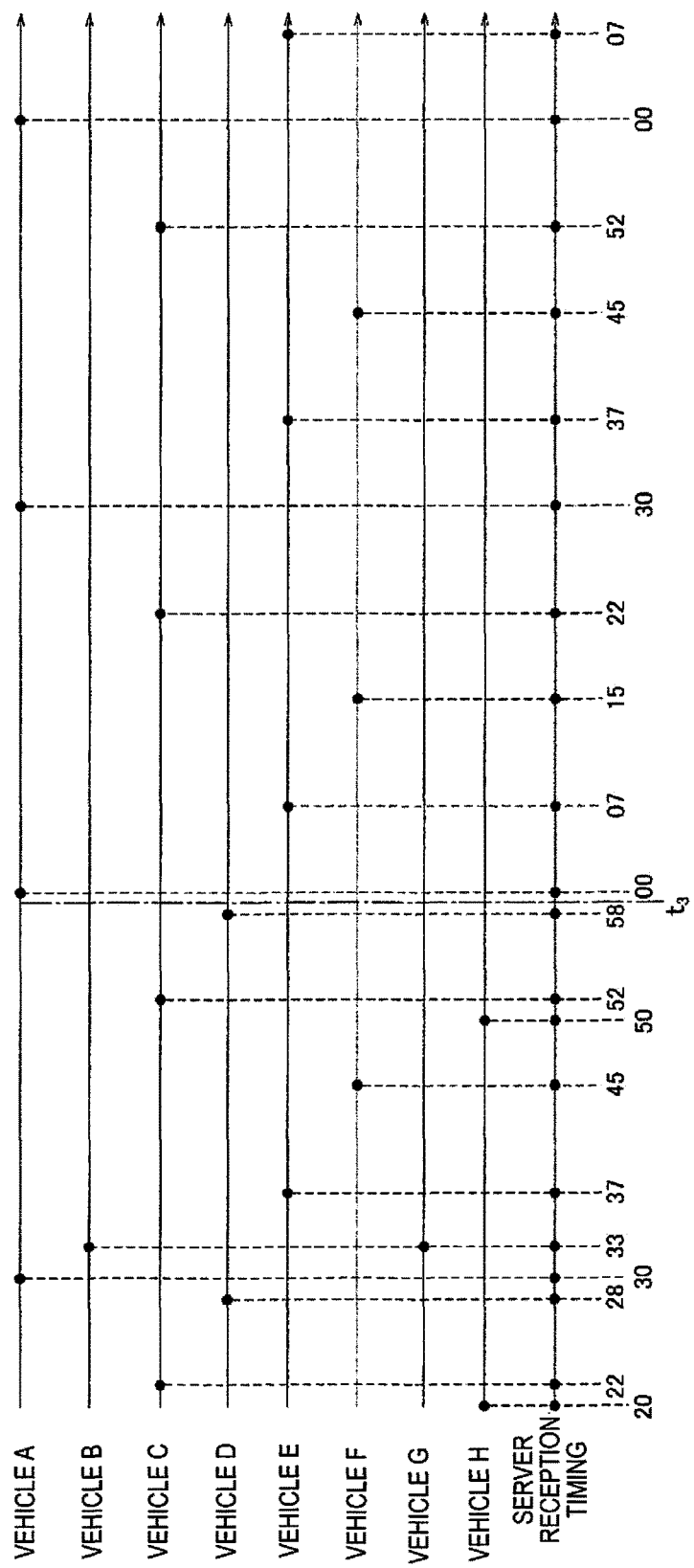
FIG. 6B is an explanatory view illustrating the transmission and reception timings of probe data when executing the data transmission vehicle reduction correction with respect to the transmission and reception timings shown in FIG. 6A.

FIG. 6A is an explanatory view illustrating the transmission and reception timings of probe data before carrying out a data transmission vehicle reduction correction, and FIG. 6B is an explanatory view illustrating the transmission and reception timings of probe data when executing the data transmission vehicle reduction correction with respect to the transmission and reception timings shown in FIG. 6A. The data transmission vehicle reduction correction action of the first embodiment will be described below, based on FIG. 6A and FIG. 6B.

In the data collection control process according to the first embodiment, when the total number of vehicles that are present within a predetermined traveling area is equal to or greater than a predetermined value Th and is relatively large, that is, when equal to or greater than a second threshold value Th2, as part of the "thinning correction," a "data transmission vehicle reduction correction" is carried out whereby the number of vehicles that transmit probe data is reduced.

A specific description is as follows. It is assumed that eight vehicles 30, vehicle A to vehicle H, are present within a predetermined traveling area. At this time, before correction, the vehicles A-H are respectively transmitting probe data every 30 seconds, based on the time at which the respective host vehicle reached an ignition ON state; and the upload times of each vehicle shall be as follows.

Vehicle A→"00 seconds and 30 seconds every minute,"
vehicle B→"03 seconds and 33 seconds every minute"
Vehicle C→"22 seconds and 52 seconds every minute,"
vehicle D→"28 seconds and 58 seconds every minute"
Vehicle E→"07 seconds and 37 seconds every minute,"
vehicle F→"15 seconds and 45 seconds every minute"
Vehicle G→"03 seconds and 33 seconds every minute,"
vehicle H→"20 seconds and 50 seconds every minute"

In this case, reception of probe data is repeated in the server 10 at timings of 20 seconds (vehicle H)→22 seconds (vehicle C)→28 seconds (vehicle D)→30 seconds (vehicle A)→33 seconds (vehicle B and vehicle G)→37 seconds (vehicle E)→45 seconds (vehicle F)→50 seconds (vehicle H)→52 seconds (vehicle C)→58 seconds (vehicle D)→00 seconds (vehicle A)→03 seconds (vehicle B and vehicle G)→07 seconds (vehicle E)→15 seconds (vehicle F)→20 seconds (vehicle H) . . . every minute, as illustrated in FIG. 6A. Consequently, the amount of probe data received by the server 10 becomes extremely large, the communication load of the server 10 becomes excessive, and it becomes difficult to carry out appropriate information processing.

With respect to the above, a "data transmission vehicle reduction correction" is executed to calculate correction values for stopping the transmission of probe data for vehicle B, vehicle D, vehicle G, and vehicle H. That is, the vehicles that transmit probe data will become vehicle A, vehicle C, vehicle E, and vehicle F, thereby halving the number of vehicles that transmit probe data. As a result, the upload times of vehicle B, vehicle D, vehicle G, and vehicle H are respectively corrected to "zero (none)."

Accordingly, when the correction values of the upload times are transmitted to vehicle B, vehicle D, vehicle G, and vehicle H at time $t_3$, the transmission of probe data from vehicle B, vehicle D, vehicle G, and vehicle H is stopped, as illustrated in FIG. 6B. As a result, the server 10 receives probe data at 00 seconds (vehicle A)→07 seconds (vehicle E)→15 seconds (vehicle F)→22 seconds (vehicle C)→30 seconds (vehicle A)→37 seconds (vehicle E)→45 seconds (vehicle F)→52 seconds (vehicle C)→00 seconds (vehicle A) . . . every minute.

In this manner, even if the total number of vehicles 30 that are present within the traveling area is large, and the amount of probe data that are transmitted to the server 10 is large, by executing the "data transmission vehicle reduction correction," it is possible to easily reduce the number of receptions of probe data in the server 10. Then, it is possible to reduce the communication load of the server 10 by appropriately spacing the intervals of the data reception timings.

Equalization Correction Action

Figure 7B:
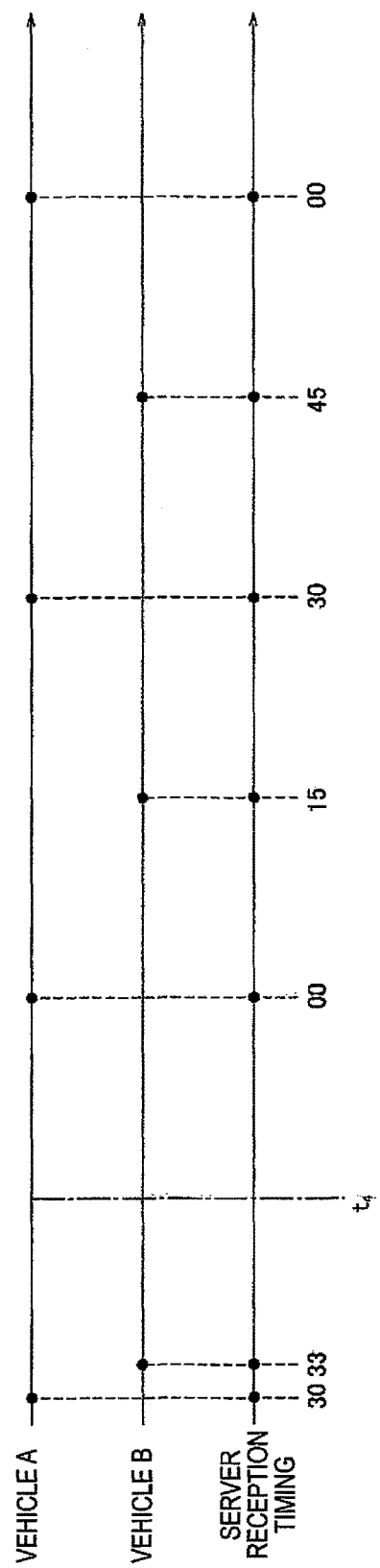
FIG. 7B is an explanatory view illustrating the transmission and reception timings of probe data when executing equalization correction with respect to the transmission and reception timings shown in FIG. 7A.

FIG. 7A is an explanatory view illustrating the transmission and reception timings of probe data before carrying out an equalization correction, and FIG. 7B is an explanatory view illustrating the transmission and reception timings of probe data when executing equalization correction with respect to the transmission and reception timings shown in FIG. 7A. The equalization correction action of the first embodiment will be described below, based on FIG. 7A and FIG. 7B.

In the data collection control process according to the first embodiment, if the total number of vehicles within a predetermined traveling area is less than the predetermined value Th, an "equalization correction" is executed whereby the upload times are offset without changing the upload intervals in each vehicle 30, and the reception intervals of the probe data by the server 10 is dispersed and correction values of upload times that make the reception intervals of the probe data by the server 10 constant are calculated.

A specific description is as follows. It is assumed that two vehicles 30, vehicle A and vehicle B, are present within a predetermined traveling area. At this time, before correction, the vehicles A, B are respectively transmitting probe data every 30 seconds, based on the time at which the respective host vehicle reached an ignition ON state; for example, it is assumed that the upload times of vehicle A are "00 seconds and 30 seconds every minute," and the upload times of vehicle B are "03 seconds and 33 seconds every minute." In this case, reception of probe data is repeated in the server 10 at timings of 00 seconds (vehicle A)→03 seconds (vehicle B)→(27-second gap)→30 seconds (vehicle A)→33 seconds (vehicle B)→(27-second gap)→00 seconds (vehicle A) . . . every minute, as illustrated in FIG. 7A. Consequently, a bias occurs in the reception timings in the server 10 wherein probe data are continuously received from two vehicles A, B, then there is a gap of a set time; therefore, it becomes impossible to grasp the traveling situation during which probe data cannot be received, and it becomes impossible to secure the real-time nature of the data.

With respect to the above, an "equalization correction" is executed to offset the upload times of the vehicles A, B such that the reception intervals of the probe data in the server 10 become uniform. That is, a correction value of 12 seconds to be added for correction is calculated such that the upload times of vehicle A are maintained at "00 seconds and 30 seconds every minute," while the upload times of vehicle B become "15 seconds and 45 seconds every minute." As a result, the upload times of vehicle B are corrected to "15 seconds and 45 seconds every minute."

Accordingly, when the correction value of the upload times is transmitted to the vehicle B at time $t_4$, the timings at which the probe data are transmitted from the vehicle B will be changed, as illustrated in FIG. 7B. As a result, the server 10 receives probe data at 00 seconds (vehicle A)→15 seconds (vehicle B)→30 seconds (vehicle A)→45 seconds (vehicle B)→00 seconds (vehicle A) . . . .

In this manner, even if the server 10 is receiving probe data at biased timings, it becomes possible to uniformly differ the reception timings of the probe data by the server 10. Then, biased idle times will not occur at the time of receiving probe data, and it becomes possible to ensure the real-time nature of the probe data. Moreover, in this equalization correction, the number of pieces of probe data that are received by the server 10 within a predetermined time (for example, one minute) can be maintained at the same number as before correction. It is thereby possible to appropriately receive probe data that are transmitted from each vehicle 30 without waste, even if the total number of vehicles 30 that are present within the predetermined traveling area is relatively small.

For the calculation of the correction values of the upload times of each vehicle A, B for making the reception intervals of probe data by the server 10 constant, first, the average reception interval in the server 10 is obtained (for example, 15 seconds, if the upload interval is 30 seconds and there are two vehicles). Next, the upload times of one vehicle (for example, vehicle A) are used as a reference. Then, the necessary offset time of the upload times of another vehicle (for example, vehicle B) to make the interval between the upload times of the vehicle to be used as the reference (vehicle A) and the upload times of the other vehicle (for example, vehicle B) to be the average reception interval in the server 10 is obtained. This offset time becomes the "correction value."

Next, the effects are described. The effects listed below can be obtained by the probe data collection method and the probe data collection device according to the first embodiment.

(1) In a probe data management system 1 comprising the server 10 that receives probe data that are transmitted from the vehicles 30, and the database 20 that stores the probe data received by the server 10, the server 10 detects a total number of the vehicles 30 that transmitted the data and upload times of the probe data for each of the vehicles 30 based on the received probe data, calculates correction values of the upload times corresponding to the total number of vehicles 30 based on the upload times detected for each of the vehicles 30, and transmits the calculated correction values to the vehicles 30. As a result, it becomes possible to both ensure the real-time nature of the collected probe data and reduce the communication load of the server.

(2) The probe data include position information, the server 10 classifies traveling areas a in which the vehicles 30 are present based on the received probe data, and the correction values are calculated for each of the vehicles 30 that are present within the classified traveling areas. As a result, it becomes possible to facilitate calculation of the correction values of the upload times, and to promptly correct the upload times with respect to changes in the total number of vehicles.

(3) When calculating the correction values, the server 10 carries out a thinning correction for reducing the number of pieces of probe data received by the server 10 during a predetermined period upon detecting the total number of the vehicles 30 being equal to or greater than a predetermined value Th that is set in advance, and carries out an equalization correction whereby the upload times are offset without changing the upload intervals of the probe data, and the reception intervals of the probe data by the server 10 are dispersed upon detecting the total number of the vehicles 30 being less than the predetermined value Th. It is thereby possible to dynamically change the reception frequency of the probe data by the server 10 in accordance with the vehicle density for each traveling area, and to appropriately prevent an excessive communication load on the server 10 and secure the real-time nature of the probe data.

(4) The server 10 carries out thinning correction by increasing the upload intervals of the probe data by the vehicles 30. As a result, biased idle times are less likely to occur at the time of receiving probe data, and it becomes possible to ensure the real-time nature of the probe data.

(5) The server 10 carries out the thinning correction by reducing the number of uploads of the probe data by the vehicles 30. As a result, it is possible to reduce the communication load of the server 10 by appropriately spacing the intervals of the data reception timings.

(6) The server 10 carries out thinning correction by reducing the number of vehicles that transmit the probe data. As a result, it is possible to reduce the communication load of the server 10 by appropriately spacing the intervals of the data reception timings.

(7) The server 10 carries out equalization correction by calculating the correction values of the upload times that make the reception intervals of the probe data by the server 10 constant. As a result, the probe data that are transmitted from each vehicle 30 can be received without waste, biased idle times will not occur at the time of receiving probe data, and it becomes possible to ensure the real-time nature of the probe data.

(8) In a probe data management system 1 comprising a server 10 that receives probe data that are transmitted from vehicles 30, and a database 20 that stores the probe data received by the server 10, the server 10 comprises a probe data collection controller 12 that detects a total number of vehicles that transmitted the data, and upload times of the probe data for each of the vehicles based on the received probe data, calculates correction values of the upload times corresponding to the total number of vehicles 30 based on the upload times detected for each of the vehicles 30, and transmits the calculated correction values to the vehicles 30, respectively. As a result, it becomes possible to both ensure the real-time nature of the collected probe data and reduce the communication load of the server.

The probe data collection method and the probe data collection device of the present invention were described above based on the first embodiment, but specific configurations thereof are not limited to this first embodiment, and various modifications and additions to the design can be made without departing from the scope of the invention according to each claim in the Claims.

In the first embodiment, an example was shown in which, when executing the "transmission interval extension correction," the upload intervals of all vehicles A-C that are present within a predetermined traveling area are extended. However, it is not necessary to extend the upload interval depending on the vehicle. That is, it is sufficient if the setting of the extension time of the upload intervals is carried out such that the reception timings in the server 10 becomes appropriate, based on the upload times of the vehicles A-C that are present within the traveling area before correction and the reception timings of the probe data in the server 10.

In addition, in the first embodiment, an example was shown in which, when executing the "transmission data number reduction correction," the number of uploads of all vehicles A-E that are present within a predetermined traveling area are halved. However, it is not necessary to halve the number of uploads depending on the vehicle, and the number of uploads to be reduced may be a reduction of ⅓ or a reduction of ¼. That is, it is sufficient if the setting of the number of uploads to be reduced during a predetermined time is carried out such that the reception timings in the server 10 becomes appropriate, based on the upload times of the vehicles A-E that are present within the traveling area before correction and the reception timings of the probe data in the server 10.

Furthermore, in the first embodiment, an example was shown in which, when executing the "data transmission vehicle reduction correction," the transmission of probe data is stopped with respect to arbitrarily selected vehicles (B, D, G, H) from among the vehicles A-H that are present within a predetermined traveling area. However, it is sufficient if the selection of vehicles to stop the transmission of probe data is carried out such that the reception timings in the server 10 becomes appropriate, based on the upload times of the vehicles A-H that are present within the traveling area before correction and the reception timings of the probe data in the server 10.

Additionally, in the first embodiment, an example was shown in which, when executing the "equalization correction," the correction values of the upload times that make the reception intervals of the probe data by the server 10 constant are calculated. However, the present invention is not limited thereto; it is sufficient if the upload times are offset without changing the upload intervals in the vehicles A, B that are present within the traveling area and the reception intervals of the probe data by the server 10 are dispersed, but it is not necessary for the reception intervals of the probe data to be strictly uniform. That is, it is sufficient to eliminate extreme bias in the reception intervals of the probe data by the server 10 by offsetting the upload times.

Furthermore, in the first embodiment, an example was shown in which, when the correction of the upload times of the vehicles 30 that are present in each traveling area is completed for all the traveling areas that are set in advance, vehicles that are in the ignition ON state are detected again, the current position and the upload times of each vehicle 30 are reviewed, and the upload times are corrected. However, no limitation is imposed thereby, and it is not necessary to carry out a correction for vehicles that have undergone correction of the upload times once until the ignition OFF state is reached. In addition, it is not necessary to carry out the next correction during a predetermined time after correcting the upload times, or when present within the same traveling area, or while traveling on the same type of road.

In the first embodiment, an example was shown in which correction values of the upload times of the vehicles 30 are calculated for each of a plurality of traveling areas that are obtained by partitioning an area from which the server 10 can receive probe data into a plurality of traveling areas. However, calculation of the correction values of the upload times may be carried out for all of the areas from which the server 10 can receive probe data. That is, in the present invention, it is sufficient if the server 10 calculates the correction values of the upload times based on the number of vehicles that transmitted probe data and the upload times for each of the vehicles, and if the reception timings of the probe data can be dynamically controlled.

The invention claimed is:

1. A probe data collection method for a probe data management system having a server that receives probe data transmitted from vehicles, and a database that stores the probe data received by the server, the probe data collection method comprising:
   the server
      detecting a total number of the vehicles that transmitted the probe data and upload times of the probe data for each of the vehicles based on the probe data received,
      calculating correction values of the upload times corresponding to the total number of the vehicles based on the upload times detected for each of the vehicles,
      carrying out thinning correction, when calculating the correction values, for reducing a number of pieces of the probe data received by the server during a predetermined period upon detecting the total number of the vehicles being equal to or greater than a predetermined value that is set in advance,
      carrying out an equalization correction, when calculating the correction values, whereby the upload times are offset without changing upload intervals of the probe data upon detecting the total number of the vehicles being less than the predetermined value, and
      transmitting the correction values calculated to the vehicles respectively.

2. The probe data collection method according to claim 1, wherein
   the probe data include position information,
   the server classifying traveling areas in which the vehicles are present, based on the received probe data, and calculating of the correction values for each of the vehicles that are present within the traveling areas that were classified.

3. The probe data collection method according to claim 1, wherein the server carrying out the thinning correction by increasing the upload intervals of the probe data by the vehicles.

4. The probe data collection method according to claim 1, wherein the server carrying out the thinning correction by reducing a number of uploads of the probe data by the vehicles.

5. The probe data collection method according to claim 1, wherein the server carrying out the thinning correction by reducing a number of the vehicles that transmit the probe data.

6. The probe data collection method according to claim 1, wherein the server carrying out the equalization correction by calculating the correction values of the upload times that make the reception intervals of the probe data constant.

7. A probe data collection device in a probe data management system, the probe data collection device comprising:
   a server that receives probe data transmitted from vehicles; and
   a database that stores the probe data received by the server,
   the server comprising a probe data collection controller which
      detects a total number of the vehicles that transmitted the probe data, and upload times of the probe data for each of the vehicles based on the received probe data,
      calculates correction values of the upload times corresponding to the total number of the vehicles based on the upload times detected for each of the vehicles,
      carries out thinning correction, when calculating the correction values, for reducing a number of pieces of the probe data received by the server during a predetermined period upon detecting the total number of the vehicles being equal to or greater than a predetermined value that is set in advance,
      carries out an equalization correction, when calculating the correction values, whereby the upload times are offset without changing upload intervals of the probe data upon detecting the total number of the vehicles being less than the predetermined value, and
      transmits the correction values calculated to the vehicles, respectively.

\* \* \* \* \*